United States Patent
Ge et al.

(10) Patent No.: US 8,804,293 B2
(45) Date of Patent: Aug. 12, 2014

(54) PROTECTION CIRCUIT FOR MEMORY CONTROL CHIP

(71) Applicant: Hong Fu Jin Precision Industry (ShenZhen) Co., Ltd., Shenzhen (CN)

(72) Inventors: Ting Ge, Shenzhen (CN); Ying-Bin Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 15 days.

(21) Appl. No.: 13/721,048

(22) Filed: Dec. 20, 2012

(65) Prior Publication Data

US 2013/0170087 A1    Jul. 4, 2013

(30) Foreign Application Priority Data

Dec. 29, 2011 (CN) .......................... 2011 1 0450137

(51) Int. Cl.
*H02H 3/00* (2006.01)

(52) U.S. Cl.
USPC ............................................. 361/92; 361/18

(58) Field of Classification Search
USPC ...................................................... 361/18, 92
See application file for complete search history.

(56) References Cited

U.S. PATENT DOCUMENTS 5,815,455 A * 9/1998 Braithwaite et al. .......... 365/229
2008/0168288 A1* 7/2008 Jia et al. ........................ 713/323

* cited by examiner

*Primary Examiner* — Danny Nguyen
(74) *Attorney, Agent, or Firm* — Novak Druce Connolly Bove + Quigg LLP

(57) ABSTRACT

A protection circuit for a memory control chip of a computer includes a controller, a switch circuit, a memory control chip, and a delay circuit. The controller outputs a high level control signal when the computer is in a first state, and outputs a low level control signal when the computer is in a second state. The switch circuit connects or disconnects the connection between a power pin of the memory control chip and a power terminal, according to the control signal. The delay circuit imposes a predetermined time delay for receiving a high level control signal, and outputs an enable signal to an enable pin of the memory control chip to make the memory control chip operate again, after a predetermined delay.

9 Claims, 1 Drawing Sheet

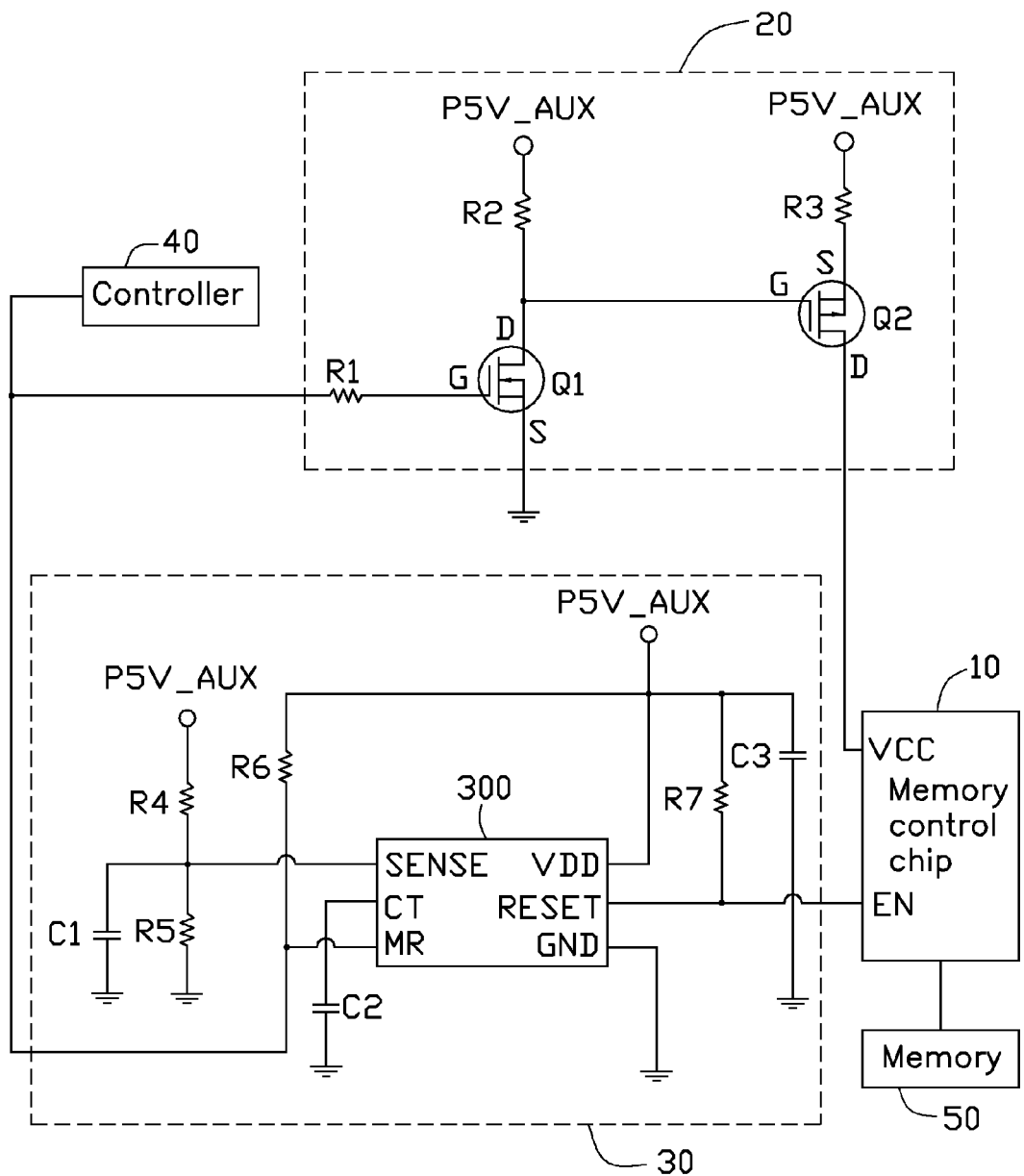

PROTECTION CIRCUIT FOR MEMORY CONTROL CHIP

BACKGROUND

1. Technical Field

The present disclosure relates to a circuit for protecting a memory control chip.

2. Description of Related Art

According to the specification of advanced configuration and power management interface (ACPI), the ACPI defines states S0-S5 to represent different operating states of a computer. Data for processing by a central processing unit (CPU) of the computer is obtained from a memory. When the CPU cannot obtain data from the memory, the computer will fail to bootstrap. For example, when the computer in an S0 state is changed to a S4 or S5 state, a memory control chip will record error information, such as under voltage protection (UVP), and the computer will fail to change back from the state S4 or S5 to the state S0. In detail, the memory control chip receives an enable signal to stop working before a power source of the memory control chip is turned off, so that the memory control chip will malfunction when the computer bootstraps the next time.

Therefore, there is room for improvement in the art.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present disclosure.

The FIGURE is a circuit diagram of an embodiment of a protection circuit for a memory control chip of the present disclosure.

DETAILED DESCRIPTION

The FIGURE illustrates an embodiment of a protection circuit for a memory control chip 10 of a computer. The protection circuit includes a switch circuit 20, a delay circuit 30, and a controller 40.

The controller 40 outputs a control signal according to the current state of operation of the computer. For example, when the computer is in the state S4 or S5, the controller 40 outputs a low level control signal, and when the computer is in one of the states S0, S1, S2, or S3, the controller 40 outputs a high level control signal. In the embodiment, the controller 40 is a complex programmable logic device (CPLD).

The switch circuit 20 includes two field effect transistors (FETs) Q1 and Q2, and three resistors R1-R3. A gate G of the FET Q1 is connected to the controller 40 through the resistor R1, to receive the control signal outputted by the controller 40. A source S of the FET Q1 is grounded, and a drain D of the FET Q1 is coupled to a power terminal P5V_AUX through the resistor R2, and also coupled to a gate G of the FET Q2. A source S of the FET Q2 is coupled to the power terminal P5V_AUX through the resistor R3. The drain D of the FET Q2 is coupled to a power pin VCC of the memory control chip 10. In the embodiment, the FET Q1 is an n-channel FET, and the FET Q2 is a p-channel FET.

The delay circuit 30 includes four resistors R4-R7, three capacitors C1-C3, and a delay chip 300. In the embodiment, the delay chip 300 includes a voltage sensing pin SENSE, a delay pin CT, a signal input pin MR, a reset pin RESET, a voltage pin VDD, and a ground pin GND. The signal input pin MR is coupled to the controller 40, to receive the control signal, and coupled to the power terminal P5V_AUX through the resistor R6. The delay pin CT is grounded through the capacitor C2. The voltage sensing pin SENSE is coupled to the power terminal P5V_AUX through the resistor R4, and is grounded through the resistor R5. The capacitor C1 is connected in parallel with the resistor R5. The reset pin RESET is coupled to the power terminal P5V_AUX through the resistor R7, and also coupled to an enable pin EN of the memory control chip 10. The ground pin GND is grounded. The voltage pin VDD is coupled to the power terminal P5V_AUX, and is grounded through the capacitor C3.

In the embodiment, when one of the voltage sensing pin SENSE and the signal input pin MR receives a high level signal, the reset pin RESET of the delay chip 300 outputs a low level enable signal, and when the voltage sensing pin SENSE and the signal input pin MR both receive high level signals, the reset pin RESET of the delay chip 300 outputs a high level enable signal after a predetermined time period that depends on the capacity of the capacitor C2. For example, the delay chip 300 will delay for 1 microsecond (ms) if the capacity of the capacitor C2 is 0.1 microfarads (g).

When the computer is changing from the state S0 to the state S4 or S5, a memory 50 controlled by the memory control chip 10 is changing from an operational state to a non-operational state. The controller 40 outputs a low level control signal. Thus, the gate G of the FET Q1 receives the low level control signal, the FET Q1 turns off, and the gate G of the FET Q2 is at high level, so that the FET Q2 turns off. In the meanwhile, the signal input pin MR receives the low level control signal, and the voltage sensing pin SENSE is at high level. Accordingly, when the computer is changing from the state S0 to the state S4 or S5, the power terminal of the power pin VCC of the memory control chip 10 is at a low voltage level to reset the memory control chip 10. This arrangement allows an efficient way to prevent the memory control chip 10 being in an error state.

When the computer is changed from the state S4 or S5 back to the state S0, the memory 50 is changing from the non-operational state to the operational state. The controller 40 outputs the high level control signal as the computer is in the state S0. Thus, the gate G of the FET Q1 receives the high level control signal, the FET Q1 turns on, and the drain D of the FET Q1 outputs a low level signal. The gate G of the FET Q2 receives the low level signal, and the FET Q2 is turned on, so that the power pin VCC of the memory control chip 10 is coupled to the power source P5V_AUX. In the meantime, the signal input pin MR of the delay chip 300 receives the high level control signal, and the voltage sensing pin SENSE of the delay chip 300 is at high level, so that the delay chip 300 outputs a low level enable signal from the reset pin RESET after the predetermined time period, e.g. 1 ms. Accordingly, the delay chip 10 outputs a high level enable signal to the enable pin EN of the memory control chip 10 after the predetermined delay, so as to prevent the memory control chip 10 from assuming an under voltage protection (UVP).

According to the description as above, the FETs Q1 and Q2 function as electronic switches. In other embodiments, the FETs Q1 and Q2 can be replaced by other switches. For example, the FET Q1 can be replaced by a pnp transistor, in which the base, emitter, and collector of the pnp transistor respectively correspond to the gate G, source S, and drain D of the FET Q1. The FET Q2 can be replaced by an npn transistor, in which the base, emitter, and collector of the npn transistor correspond to the gate G, source S, and drain D of the FET Q2.

While the disclosure has been described by way of example and in terms of preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A protection circuit for a memory control chip of a computer, the protection circuit comprising:

a controller configured to output a high level control signal in response to the computer being in a first state, and outputs a low level control signal in response to the computer being in a second state;

a switch circuit, comprising a first electronic switch and a second electronic switch, wherein a first terminal of the first electronic switch is connected to the controller to receive the control signal outputted by the controller, a second terminal of the first electronic switch is grounded, a third terminal of the first electronic switch is coupled to a power terminal, and coupled to a first terminal of the second electronic switch, a second terminal of the second electronic switch is coupled to the power terminal, the second terminal of the first electronic switch is connected to the third terminal of the first electronic switch in response to the first terminal of the first electronic switch receiving the high level control signal, the second terminal of the first electronic switch is disconnected from the third terminal of the first electronic switch in response to the first terminal of the first electronic switch receiving the low level control signal, the second terminal of the second electronic switch is connected to a third terminal of the second electronic switch in response to the first terminal of the second electronic switch being at a low voltage level, the second terminal of the second electronic switch is disconnected from the third terminal of the second electronic switch in response to the first terminal of the second electronic switch being at a high voltage level;

the memory control chip comprising a power pin coupled to the third terminal of the second electronic switch, and an enable pin, wherein when the memory control chip receives a high level enable signal from the enable pin, the memory control chip operates, and when the memory receives a low level enable signal, the memory control chip does not operate; and a delay circuit comprising a delay chip and a first capacitor, wherein a signal input pin of the delay chip is connected to the controller to receive the control signal from the controller, a voltage sensing pin and a power pin of the delay chip is coupled to the power terminal, a ground pin of the delay chip is grounded, a delay pin of the delay chip is grounded through the first capacitor;

wherein the voltage sensing pin and the signal input pin of the delay chip are both at high voltage level, the delay chip outputs the high level enable signal to the enable pin of the memory control chip after a predetermined time period.

2. The protection circuit of claim 1, wherein the first electronic switch is an n-channel field effective transistor (FET), the first terminal, the second terminal, and the third terminal of the first electronic switch are, respectively, a gate, a source, and a drain of the n-channel FET.

3. The protection circuit of claim 1, wherein the second electronic switch is a p-channel field effective transistor (FET), the first terminal, the second terminal, and the third terminal of the first electronic switch are, respectively, a gate, a source, and a drain of the p-channel FET.

4. The protection circuit of claim 1, wherein the switch circuit further comprises a first resistor, a second resistor, and a third resistor, the first terminal of the first electronic switch is coupled to the controller through the first resistor, the third terminal of the first electronic switch is coupled to the power terminal through the second resistor, the second terminal of the second electronic switch is coupled to the power terminal through the third resistor.

5. The protection circuit of claim 4, wherein the delay circuit further comprises a second capacitor, a fourth resistor, and a fifth resistor, a first terminal of the fifth resistor is grounded, a second terminal of the fifth resistor is coupled to the power terminal through the fourth resistor, the voltage sensing pin of the delay chip is coupled to a node between the fourth and fifth resistors, the node of the fourth and fifth resistors is grounded through the second capacitor.

6. The protection circuit of claim 5, wherein the delay circuit further comprises a third capacitor, the power terminal of the delay chip is grounded through the third capacitor.

7. The protection circuit of claim 1, wherein the delay circuit further comprises a sixth resistor, the signal input pin of the delay pin is coupled to the power terminal through the sixth resistor.

8. The protection circuit of claim 7, wherein the delay circuit further comprises a seventh capacitor, the reset pin of the delay chip is coupled to the power terminal through the seventh capacitor.

9. The protection circuit of claim 8, wherein the controller is complex programmable logic device.

* * * * *